United States Patent
Fuoco et al.

(10) Patent No.: US 6,694,385 B1
(45) Date of Patent: Feb. 17, 2004

(54) CONFIGURATION BUS RECONFIGURABLE/REPROGRAMMABLE INTERFACE FOR EXPANDED DIRECT MEMORY ACCESS PROCESSOR

(75) Inventors: Charles Fuoco, Allen, TX (US); David A. Comisky, Plano, TX (US); Sanjive Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 620 days.

(21) Appl. No.: 09/638,512

(22) Filed: Aug. 11, 2000

Related U.S. Application Data

(60) Provisional application No. 60/153,391, filed on Sep. 10, 1999.

(51) Int. Cl.[7] .................................................. G06F 3/00
(52) U.S. Cl. ........................... 710/8; 710/64; 710/104; 711/1; 712/225
(58) Field of Search .......................... 710/8, 9, 11–14, 710/18, 20, 31, 104, 13, 64; 713/1, 100; 712/225; 711/1

(56) References Cited

U.S. PATENT DOCUMENTS

| | | | | |
|---|---|---|---|---|
| 3,675,209 A | * | 7/1972 | Trost et al. ............... | 340/172.5 |
| 4,562,532 A | * | 12/1985 | Nishizawa et al. ......... | 364/200 |
| 4,775,931 A | | 10/1988 | Dickie et al. | |
| 4,885,683 A | * | 12/1989 | Coogan ...................... | 364/200 |
| 5,379,382 A | * | 1/1995 | Work et al. ................. | 395/275 |
| 5,671,355 A | | 9/1997 | Collins | |
| 6,119,188 A | * | 9/2000 | Sheafor et al. ............. | 710/107 |
| 6,260,086 B1 | * | 7/2001 | Butler et al. ................ | 710/100 |
| 6,532,533 B1 | * | 3/2003 | Bhandal et al. ............. | 712/225 |

FOREIGN PATENT DOCUMENTS

| | | |
|---|---|---|
| EP | 0 404 414 A | 12/1990 |
| EP | 0 987 625 A | 3/2000 |

* cited by examiner

*Primary Examiner*—Rehana Perveen
*Assistant Examiner*—Rijue Mai
(74) *Attorney, Agent, or Firm*—Robert D. Marshall, Jr.; W. James Brady, III; Frederick J. Telecky, Jr.

(57) ABSTRACT

The configuration bus interconnection protocol provides the configuration interfaces to the memory-mapped registers throughout the digital signal processor chip. The configuration bus is a parallel set of communications protocols, but for control of peripherals rather than for data transfer. While the expanded direct memory access processor is heavily optimized for maximizing data transfers, the configuration bus protocol is made to be as simple as possible for ease of implementation and portability.

17 Claims, 13 Drawing Sheets

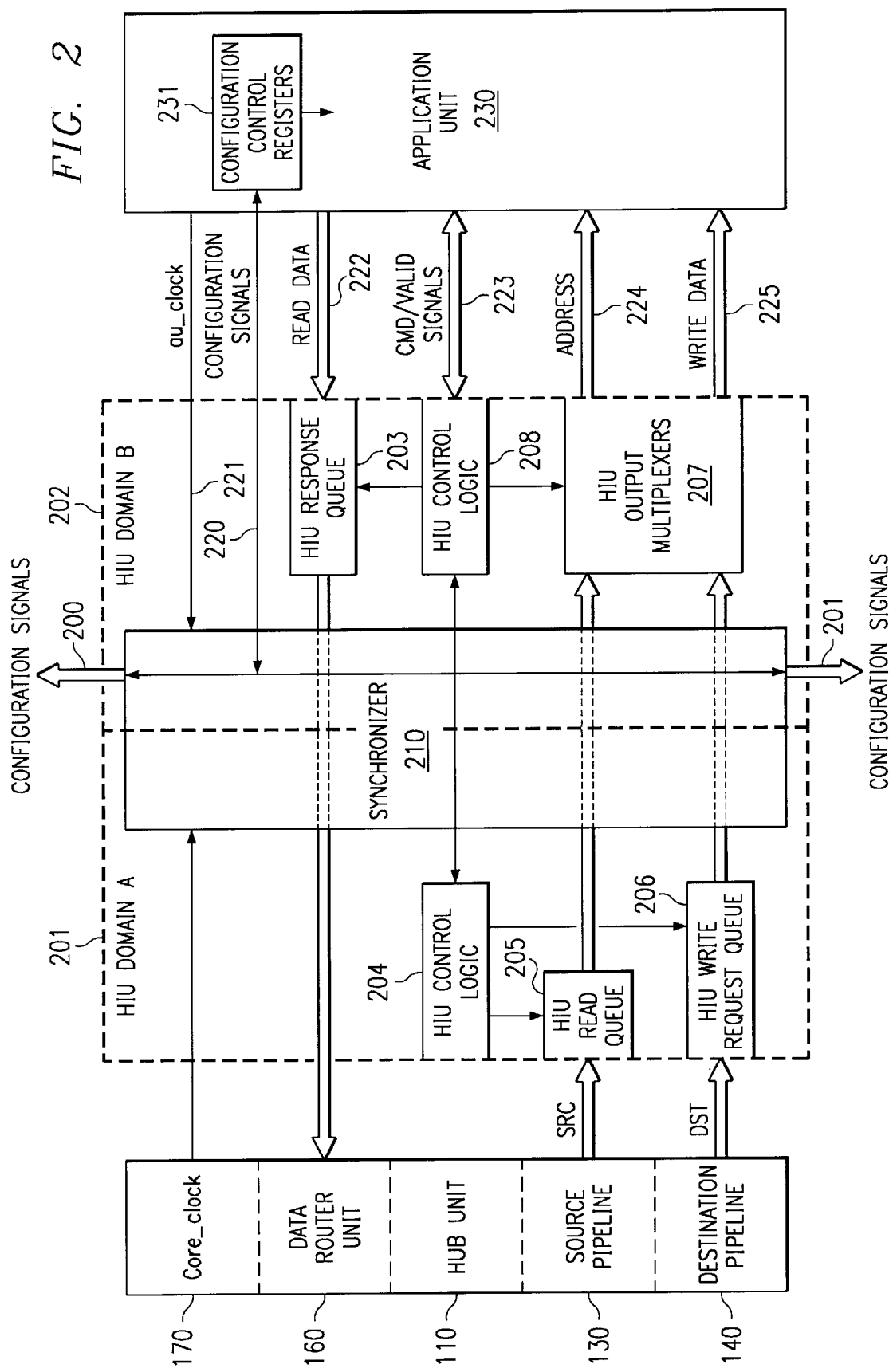

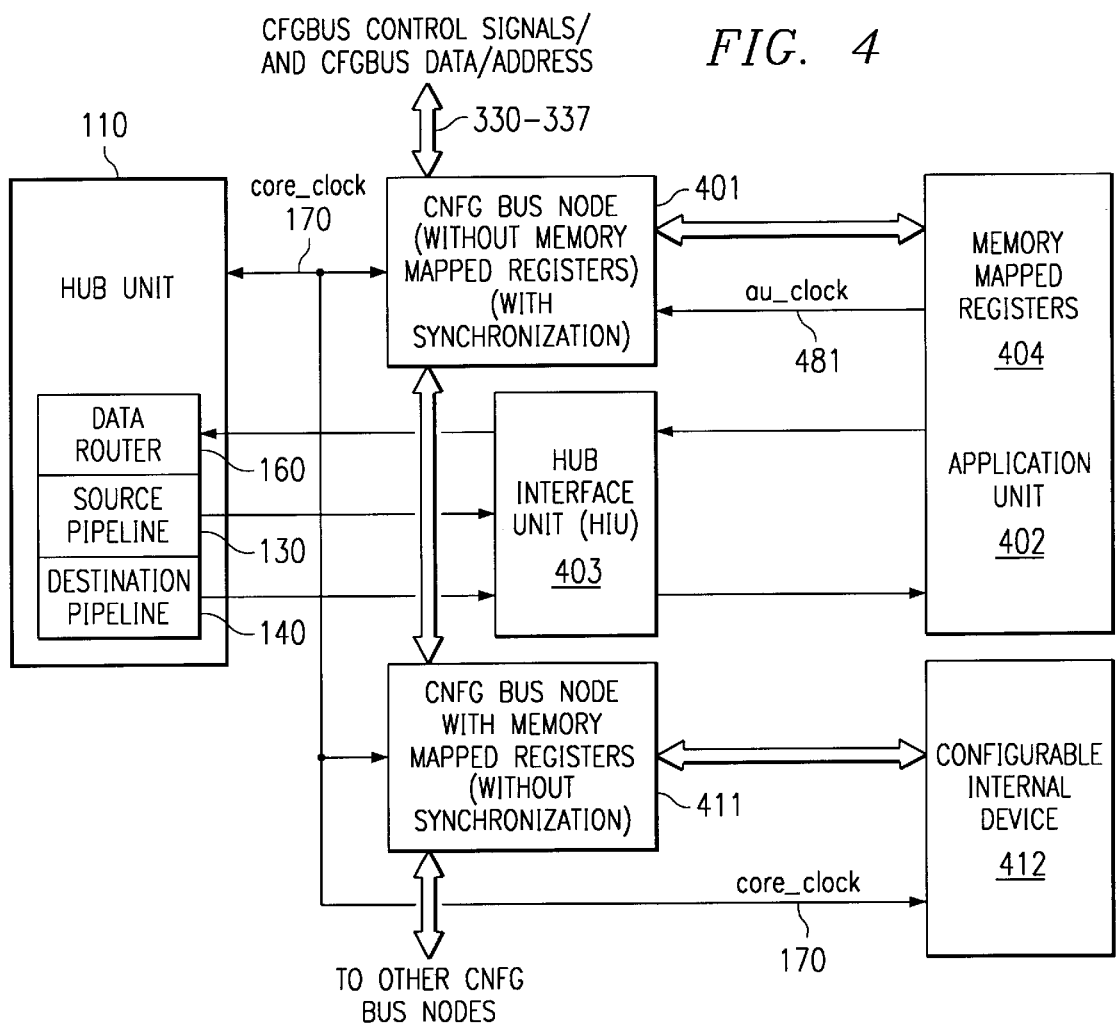
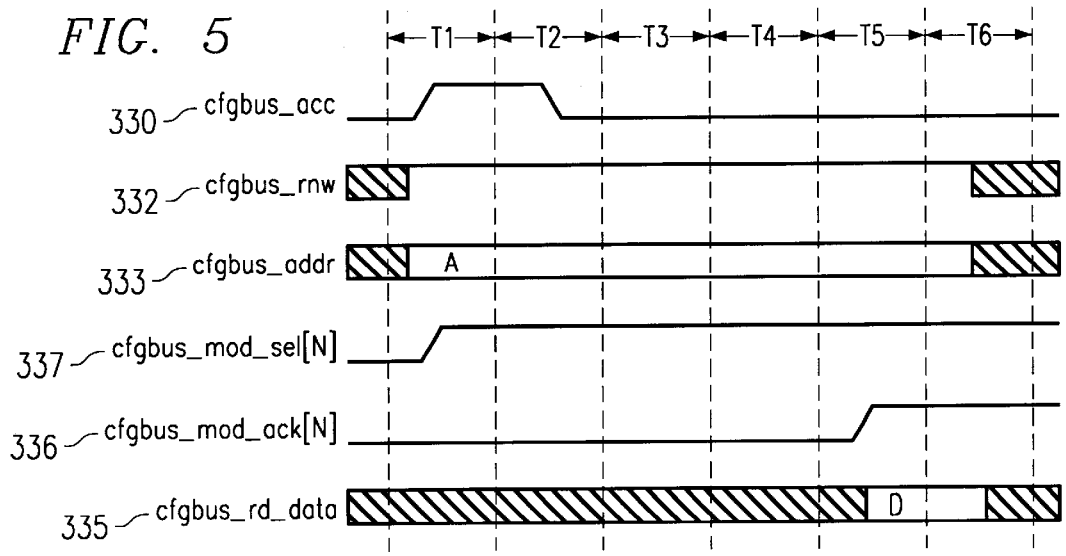

CONFIGURATION BUS RECONFIGURABLE/REPROGRAMMABLE INTERFACE FOR EXPANDED DIRECT MEMORY ACCESS PROCESSOR

This application claims priority under 35 USC §119(e)(1) of Provisional Application Ser. No. 60/153,391, filed Sep. 10, 1999.

CROSS REFERENCE TO RELATED APPLICATIONS

This application is related to the following co-pending patent applications:

U.K. Patent Application No. 9909196.1, filed Apr. 16, 1999, entitled TRANSFER CONTROLLER WITH HUB AND PORTS ARCHITECTURE, having a U.S. convention application now U.S. Pat. No. 6,496,740;

U.S. patent application Ser. No. 09/713,609, filed Nov. 15, 2000, entitled REQUEST QUEUE MANAGER IN TRANSFER CONTROLLER WITH HUB AND PORTS, claiming priority from U.S. Provisional Application No. 60/169,451 filed Dec. 17, 1999; and U.S. patent application Ser. No. 09/637,492, filed Aug. 11, 2000, entitled HUB INTERFACE UNIT AND APPLICATION UNIT INTERFACES FOR EXPANDED DIRECT MEMORY ACCESS PROCESSOR, now U.S. Pat. No. 6,594,713, claiming priority from U.S. Provisional Application No. 60/153,192 filed Sep. 10, 1999.

TECHNICAL FIELD OF THE INVENTION

The expanded direct memory access processor is the subject of U.S. patent application Ser. No. 09/713,609, filed Nov. 15, 2000, entitled REQUEST QUEUE MANAGER IN TRANSFER CONTROLLER WITH HUB AND PORTS. An expanded direct memory access processor is an interconnection network which assumes the task of communication throughout the processor system and its peripherals in a centralized function. Within the expanded direct memory access processor, a system of a main hub and ports tied together by multiple pipelines is the medium for all data communications among processors and peripherals.

The hub interface unit is of generic design. This hub interface unit is made identical for all ports, whether the attached application unit operates at the high frequency of the core processor or the much lower frequency of a some types of relatively slow peripherals. The application unit includes a variety of external port interfaces of customized design with considerable variation their internal make-up.

SUMMARY OF THE INVENTION

This invention relates to the novel aspects of a configuration bus interconnection protocol. This configuration bus interconnection protocol loads memory-mapped registers in various portions of the digital signal processor chip. Integrated circuits including an expanded direct memory access processor can utilize a configuration bus to configure the control registers throughout the external ports. Configuration takes place normally as a prelude to application usage through boot up or initialization processes. It is also possible that a device using a configuration bus of this invention could be re-configured dynamically during application usage under program control.

The configuration bus is a parallel set of communications protocols used for control of peripherals rather than for data transfer. While the expanded direct memory access processor is heavily optimized for maximizing data transfers, the configuration bus protocol and configuration bus interface is designed for simplicity, ease of implementation and portability. The configuration bus signals are of uniform definition for all application unit interfaces. The ability of the uniformly defined configuration bus to interface with a wide variety of customized peripheral units is a key feature of the invention.

BRIEF DESCRIPTION OF THE DRAWINGS

These and other aspects of this invention are illustrated in the drawings, in which:

FIG. 2 illustrates the partitioning of the external ports into two sections, a hub interface unit (HIU) and an application unit (AU);

FIG. 4 illustrates the two types of local nodes (1) an application unit with hub interface unit/application unit port interface to the expanded direct memory access and (2) a configurable internal device having no expanded direct memory access interface;

FIG. 5 illustrates the signal timing for a configuration bus read operation;

DETAILED DESCRIPTION OF PREFERRED EMBODIMENTS

Figure 1:
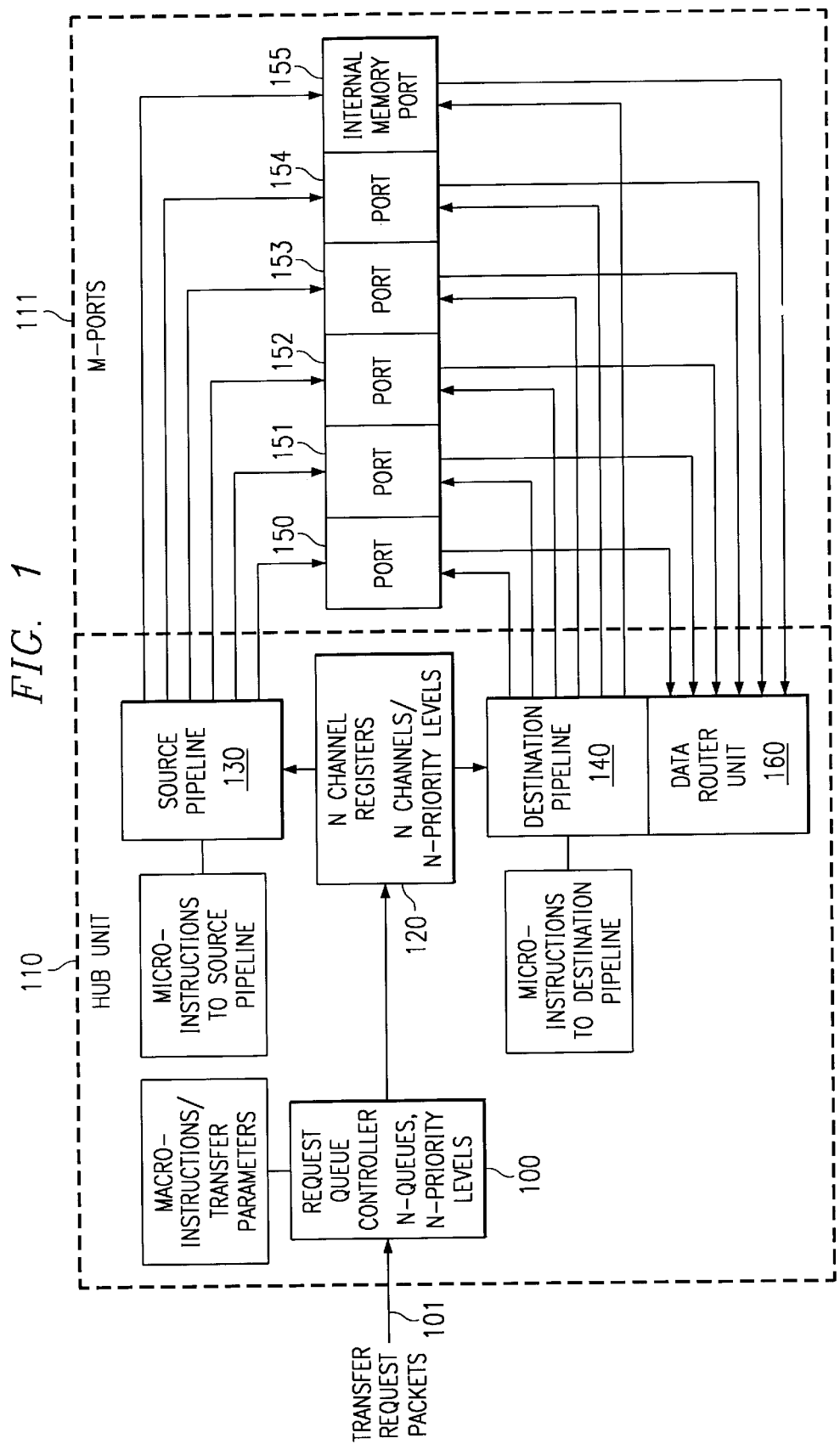
FIG. 1 illustrates a block diagram of the principal features of an expanded direct memory access processor with hub and ports architecture.

FIG. 1 illustrates a block diagram of the basic principal features of the expanded direct memory access processor. The extended direct memory access processor is basically a data transfer controller which has at its front end portion, a request queue controller 100 receiving, prioritizing, and dispatching data in the form of transfer request packets 101. The request queue controller 100 connects within the hub unit 110 to the channel registers 120 which receive the data transfer request packets and process them first by prioritizing them and assigning them to one of the N channels each of which represent a priority level. These channel registers interface with the source pipeline 130 and destination pipeline 140. These pipelines are address calculation units for source (read) and destination (write) operations.

Outputs from these pipelines are broadcast to M Ports 111. FIG. 1 illustrates six ports 150 to 155. Ports 150 to 155 are clocked either at the main processor clock frequency or at a lower (or higher) external device clock frequency. Read data from one port, for example port 150, having a destination write address of port 153 is returned to the hub destination control pipeline through the data router unit 160.

The ports 150 to 155 are divided into two sections. The application specific design (for example host port interface HPI or external memory interface EMIF) is referred to as the application unit (AU). A hub interface unit (HIU) connects the application unit and other parts of the expanded direct memory access processor.

The hub interface unit serves several functions. The hub interface unit provides buffering for read and write data to support the write driven processing. The hub interface unit prioritizes read and write commands from the source pipeline 130 and the destination pipeline 140 of the expanded direct memory access processor. The port sees a single interface with both access types consolidated. The hub interface unit decouples the external port interface clock domain from the core processor clock domain.

FIG. 2 illustrates a high-level block diagram one of the ports 150 to 155 including a hub interface unit separated into clock domain A 201 and clock domain B 202. Clock domain A 201 operates at the rate of core processor, core clock 170. Clock domain B 202 operates at the rate of application unit, AU_clock 221. FIG. 2 also shows configuration signals 200 which originate from a configuration control bus which supplies configuration control data to all configurable devices including the application unit 230. Configuration operations are done prior to the actual application usage of the device. Configuration control hardware is normally dormant during normal application usage. The core functional blocks of the hub interface unit include in clock domain A: hub interface unit control logic block 204; hub interface unit read queue 205; hub interface unit write request queue 206; and include in clock domain B: hub interface unit control block 208; hub interface unit output multiplexers 207; and hub interface unit response queue 203. These core functional blocks of the hub interface unit pass data, commands, and status signals (e.g. valid, ack) between hub unit 110 on the expanded direct memory access processor side and application unit 230 on the port side. As previously illustrated in FIG. 1, hub unit 110 include source pipeline 130, destination pipeline 140, data router unit 160 and core clock 170.

Commands, address, and data information are sent from hub 110 to HIU read queue 205 and HIU write request queue 206 of the hub interface unit. Hub interface unit control logic block 204 and hub interface control logic block 208 process this set of information and generate command, valid, and acknowledge signals (cmd/valid signals 223) which are sent to application unit 230 along with data in normal operation and configuration data during configuration cycles. In read operations the application unit 230 passes its read data, valid, and acknowledge signals (cmd/valid signals 223) to the hub interface unit. Hub interface unit output multiplexers 207 is coupled to HIU read queue 205 and HIU write request queue 206. For a read, HIU output multiplexers 207 supply address 224 to application unit 230. The read data 222 is returned to data router unit 160 of the hub unit via HIU response queue 203. For a write, HIU output multiplexers 207 supply both address 224 and write data 225 to application unit 231.

The application unit interface is a custom designed functional block which has considerable variation in its construction between units designed for different external peripheral interfaces. This means that the control logic of an application unit may vary widely but the control signals and the interface provided by the hub interface unit is compatible with a wide variety of custom application unit requirements. The application unit data path structures also vary from one kind of peripheral interface to another.

The purpose of the configuration bus (CFGBUS) provide a scalable mechanism for the central processor unit to control the on-chip peripherals, and other memory-mapped registers not directly accessible inside the central processing unit register files. The central processing unit can access (read from or write to) any control register of configuration control registers 231 in the configuration bus memory space whether for peripheral control or other control. The central processing unit simply performs a load from or store to the particular memory location. This command will be passed to an on-chip controller which will decode it as a configuration bus request and use the configuration bus to directly access configuration control registers 231. This bus is reserved for control signal distribution while all data access to the peripherals is performed through the normal expanded direct memory access processor and external direct memory access mechanisms. Keeping the control access to peripherals separate from the data access allows locked peripheral functions to be reset by the configuration bus even though the normal data bus is blocked. Also, the configuration bus is kept highly scalable in the number of peripherals attached as well as the frequency and latency ranges it supports.

Figure 3A:
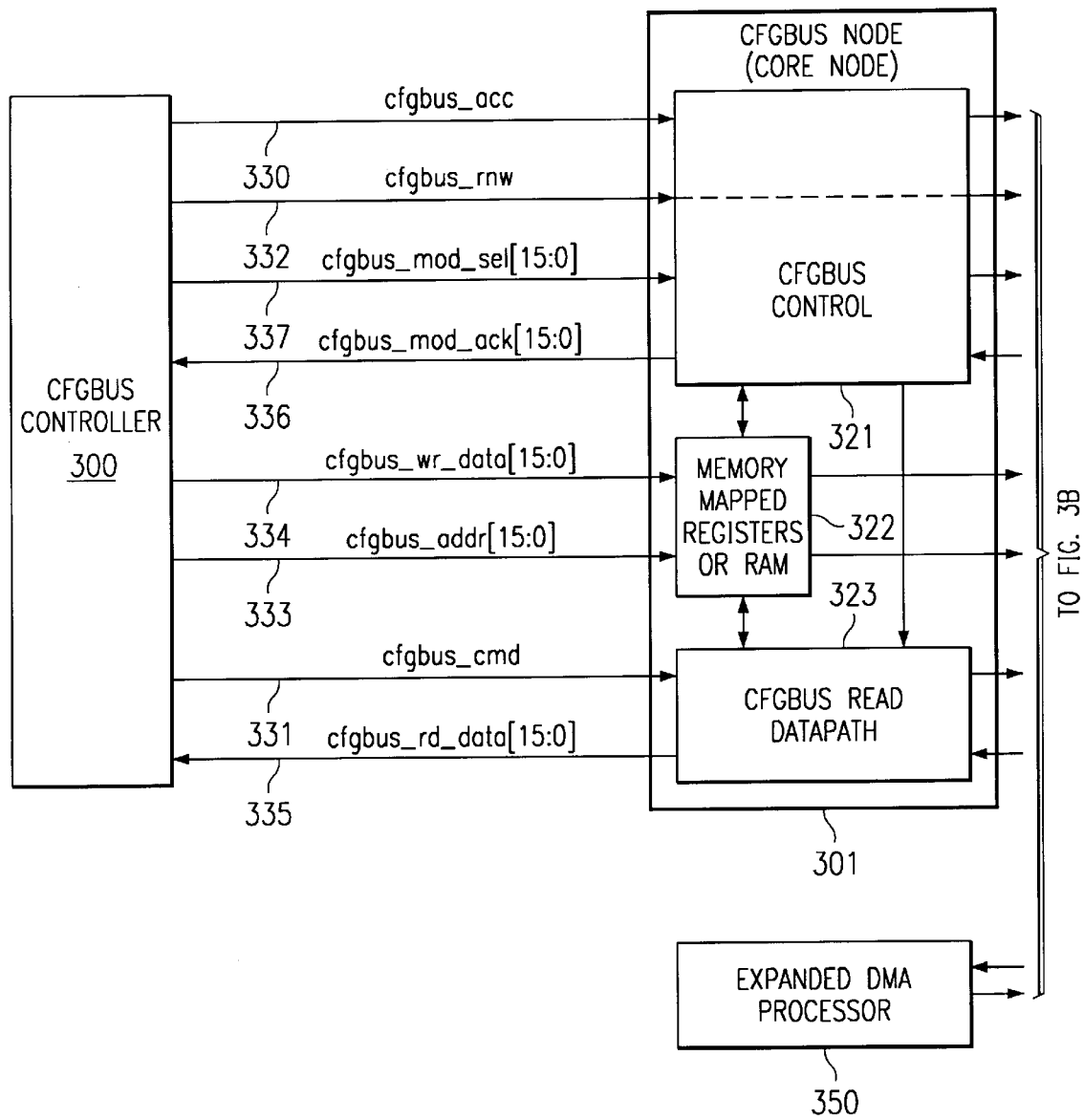
FIGS. 3A and 3B together illustrate the configuration bus controller and two configuration bus nodes, (1) for a configurable internal core device and (2) for a configurable peripheral device.
Figure 3B:
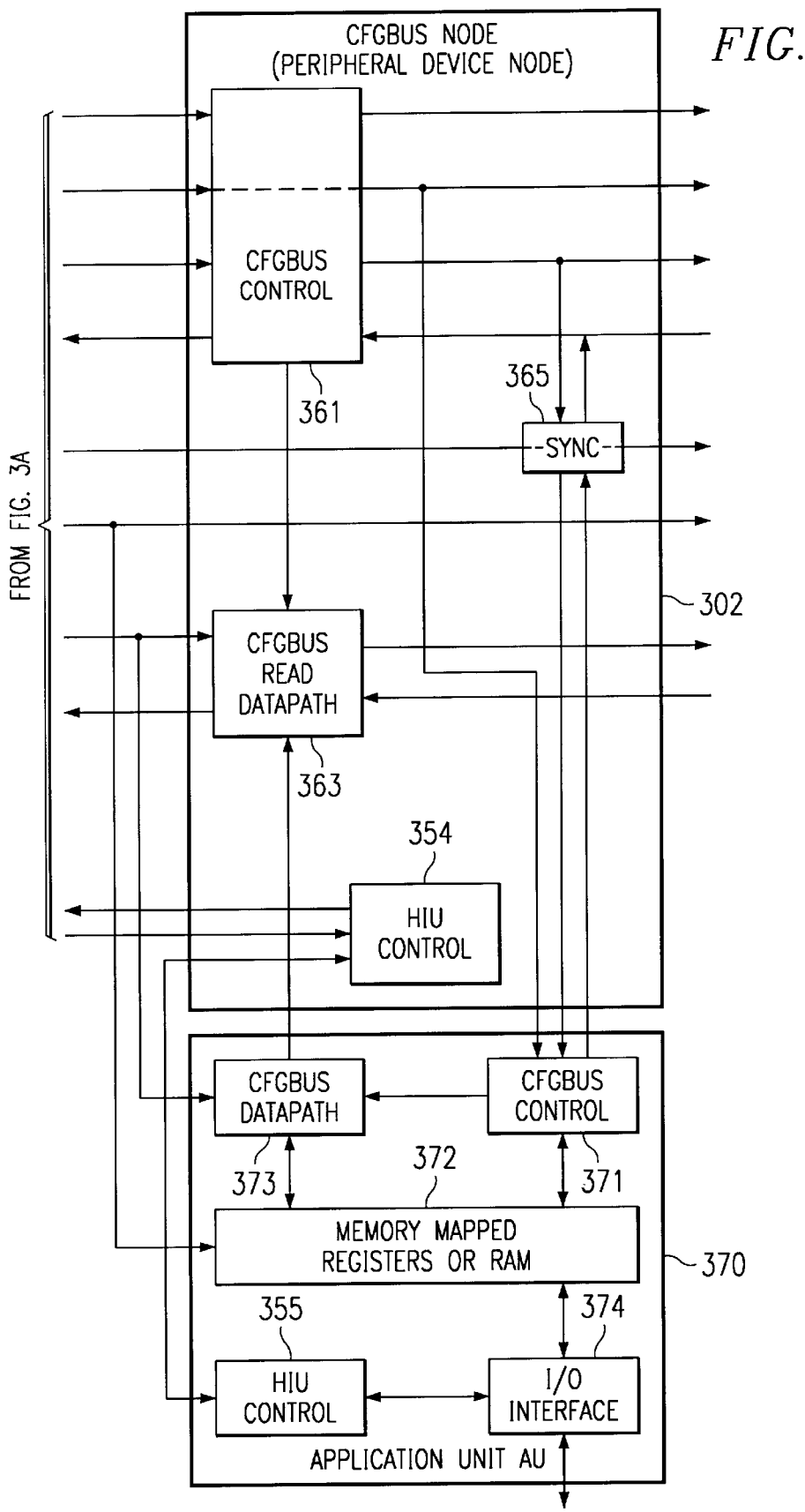

FIGS. 3A and 3B together illustrate the interconnection of the configuration bus controller 300 with two of a chain of configuration bus nodes 301 and 302. At each configuration bus node location the minimum receiving hardware is a configuration bus control device (illustrated as 321 in node 301 and 361 in node 302). These devices will provide control for the memory-mapped registers 322 and configuration bus read data path logic 323 in node 301 and configuration bus read data path logic 363 in node 302. The signals cfgbus_acc 330, cfgbus_cmd 331, cfgbus_rnw 332, cfgbus_addr[15:0] 333, cfgbut_wr_data[15:0] 334, cfgbus_rd_data[15:0] 335, cfgbus_mod_ack[15:0] 336 and cfgbus_mod_sel[15:0] 337 define the operating characteristics of the configuration bus node.

In a core node 301 the three elements configuration bus control 321, configuration bus read data path 323 and memory-mapped registers 322 provide the path for storing configuration control bits. Core node 301 is clocked by the same core clock as configuration bus controller 300 and thus needs no synchronizer. In a peripheral device node 302, the memory-mapped registers 372 are placed instead in the application unit side of the node. The synchronization block 365 provides synchronization of the core clock to the application unit clock. The hub interface unit (HIU) between the expanded direct memory access processor 350 and the application unit 370 is partitioned into a core clock domain HIU control block 354 and an application unit clock domain HIU control block 355.

The main goal of the configuration bus protocol is to create as simple a bus protocol as possible for initialization by the processor of the memory-mapped registers which drive peripherals and other units of the integrated circuit. This kind of interface does not require high speed transfers or quick turnarounds, but is straightforward to implement and fully portable to other platforms or other peripherals. Another central objective of the configuration bus is adaptability to any peripheral, no matter what its frequency of operation. This implies that the configuration bus must easily interface with synchronizer functions and not cause limitations on the allowable speed of the peripherals attached.

FIG. 3 illustrates individual signal types which the configuration bus controller and its successive nodes pass in both directions through the configuration bus nodes. The configuration bus can support up to 16 peripherals. Each of the 16 peripherals uses a corresponding bit cfgbus_mod_sel[N] of cfgbus_mod_sel[15:0] signal 337 and a corresponding bit cfgbus_mod_ack[N] of cfgbus_mod_ack[15:0] signal 336. Configuration bus controller 300 decodes the address of the request to one of the Nth peripherals and uses the cfgbus_mod_sel[N] and cfgbus_mod_ack[N] as the control bits for that configuration bus access. In order to simplify synchronization, the configuration bus protocol switches the cfgbus_mod_sel level to indicate an access for a peripheral, and detects a switch on the cfgbus_mod_ack level when the peripheral has completed the request.

All the peripherals must pass the cfgbus_rd_data[15:0] 335 through a chain as illustrated in FIG. 3. By passing the cfgbus_rd_data 335 through each peripheral, wire routing is simplified, reducing the complexity of the configuration bus controller 300. The peripherals must monitor the cfgbus_acc signal 330 and pass the upstream cfgbus_rd_data 335 downstream when there is not a local access to that peripheral. The peripherals capture cfgbus_rd_data 335 when there is a local access to that peripheral. When configuration bus controller 300 performs a write operation, it asserts the cfgbus_acc signal 330 high to indicate a new access on the configuration bus, and asserts the cfgbus_rnw 332 low to indicate a write. Configuration bus controller 300 also places the 16-bit address on the cfgbus_addr 333, and the write data on the cfgbus_wr_data 334.

FIG. 4 illustrates the two types of local nodes configurable by the configuration bus. FIG. 4 contrasts HIU/AU ports with a configurable internal core device node. The signal flow of signals 330 through 337 from the configuration bus controller 300 in FIG. 3 through both configurable application unit 402 and configurable internal device 412 is shown.

Configuration bus node 401 of the HIU/AU ports local node and configuration bus node 411 of the internal core device node receive and passes the configuration bus signals 330 to 337. The HIU/AU ports local node stores data in memory-mapped registers 404 selected by the appropriate bit within cfgbus_mod_sel[15:0]. Likewise, configuration bus node 411 stores data within included memory-mapped registers.

Figure 6:
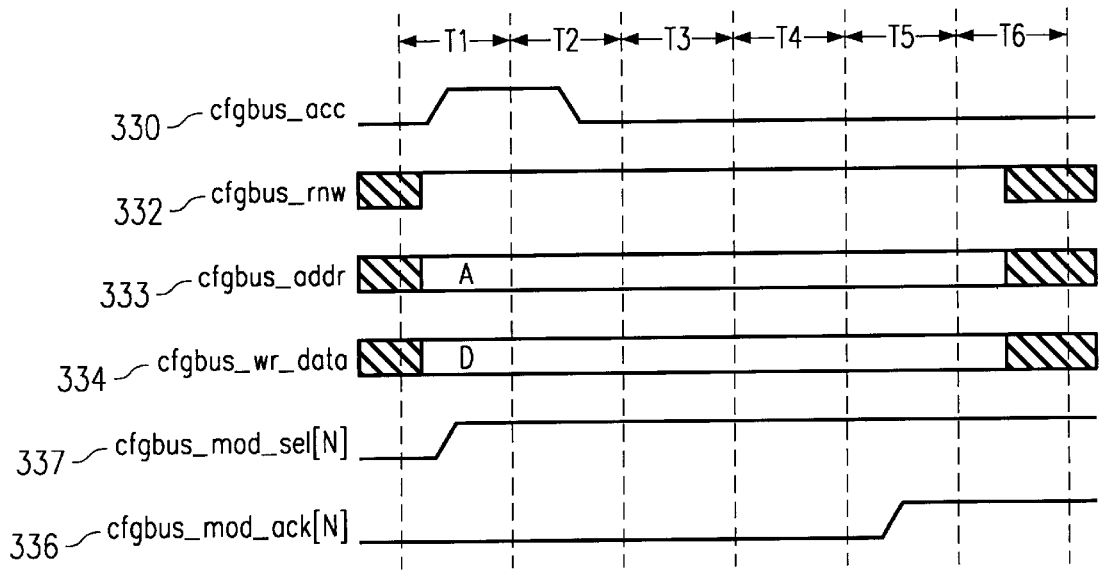
FIG. 6 illustrates the signal timing for a configuration bus write operation.
Figure 7:
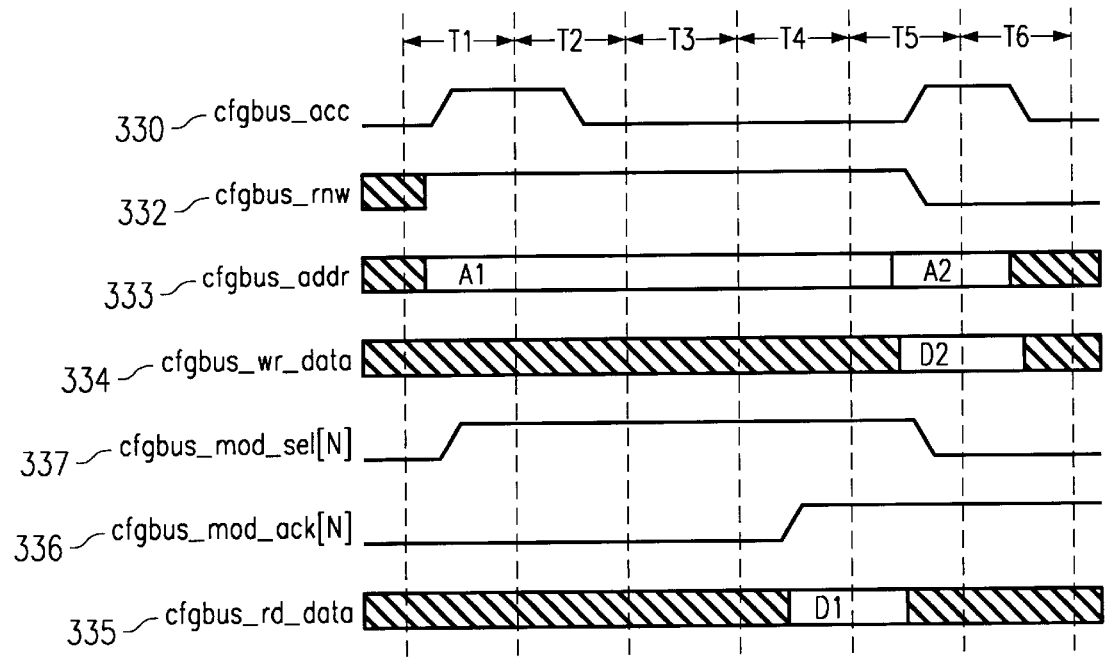
FIG. 7 illustrates the signal timing for two successive configuration bus operations, a read followed by a write.

The timing details of configuration bus read and write operations are described in FIGS. 5, 6, and 7. First, the configuration bus must read appropriate information from the configurable device. This data identifies the device type and any special parameters which affect configuration. Once this read operation is accomplished, the configuration bus controller develops the required configuration control bits. These bits are then stored in the memory-mapped registers in the configuration bus write operation. Once a memory-mapped register has received its appropriate configuration control bits, these bits are used as inputs to functions within the configurable device. This may alter their mode controls, multiplexer switch positions or other such select signals. This accomplishes the initializing and set up of these configurable functions.

FIG. 5 illustrates the timing of a configuration bus read cycle. When configuration bus controller 300 performs a read operation, it asserts the cfgbus_acc signal 330 high during time cycle Ti to indicate a new access on the configuration bus. It also asserts the cfgbus_rnw 332 high during time cycle T1 to indicate a read operation, and places the 16-bit word address on the cfgbus_addr signal 333. In addition, it switches the level of the cfgbus_mod_sel[X] 337 bit corresponding to that peripheral all during time cycle T1. When the peripheral completes the read during time cycle T5, the peripheral places the data on the cfgbus_rd_data signal 335, and switches the level of its cfgbus_mod_ack[X] 336 bit. Configuration bus controller 300 detects the cfgbus_mod_ack[X] switch and senses the data on the cfgbus_rd_data 335.

For a read from configuration bus node 301, configuration bus control block 321 detects a corresponding module select signal cfgbus_mod_sel 337 and detects the read indicated by cfgbus_rnw 332 when cfgbus_acc 330 indicates a pending configuration bus access. The address signal cfgbus_addr 333 is applied to memory mapped registers/RAM 322. Configuration bus read data path 323, in response to a signal from configuration bus control block 321 that the cfgbus_mod_sel 337 selects that configuration node, cuts off transmission of read data from downstream nodes. Instead, configuration bus read data path 323 supplies read data recalled from memory mapped registers/RAM 322 on cfgbus_rd_data 335. As described above, data stored within the configuration memory space of the peripheral identifies the device type and any special parameters which affect configuration.

For a read from configuration bus node 302, configuration bus control block 361 detects a corresponding module select signal cfgbus_mod_sel 337 and detects the read indicated by cfgbus_rnw 332 when cfgbus_acc 330 indicates a pending configuration bus access. The address signal cfgbus_addr 333 is applied to memory mapped registers/RAM 372 within application unit 370. Configuration bus read data path 363, in response to a signal from configuration bus control block 361 that the cfgbus_mod_sel 337 selects that configuration node, cuts off transmission of read data from downstream nodes. Instead, configuration bus read data path 363 supplies read data recalled from memory mapped registers/RAM 372 on cfgbus_rd_data 335. Note that the memory read from memory mapped registers/RAM 372 is timed according to the clock of application unit 370. The inputs to memory mapped registers/RAM 372 are synchronized to the application unit clock via synchronization block 365 and configuration control block 371. Data stored at the addressed location is read from memory mapped registers/RAM 372 and supplied to cfgbus_rd_data 335 via application unit clocked configuration data path 373 and core clocked configuration data path 363. When the read is complete, that is when valid data is supplied to cfgbus_rd_data bus 335, then configuration bus control block 371 sends a signal to synchronizer 365. This is synchronized to the core clock and supplies to configuration bus control block 361 which the corresponding acknowledge signal cfgbus_mod_ack 336. As described above, data stored within the configuration memory space of the peripheral identifies the device type, operational characteristics and any special parameters which affect configuration. This data may be accessed from the peripheral via I/O interface 374 under control of hub interface unit control block 355.

Referring to FIG. 6, when the configuration bus controller 300 performs a write operation, it asserts the cfgbus_acc signal 330 high during time cycle T1 to indicate a new access on the configuration bus. It also asserts the cfgbusrnw 332 low during time cycle T1 to indicate a write. The configuration bus controller 300 also places the 16-bit address on the cfgbus_addr signal 333, and the data on the cfgbus_wr_data signal 334 all during time cycle T1. In addition configuration bus controller 300 switches the corresponding cfgbus_mod_sel[X] 337 bit during time cycle T1 for the peripheral accessed. When the peripheral has completed the write in time cycle T5, it switches the level of the corresponding cfgbus_mod_ack[X] 336 bit, allowing the configuration bus controller to proceed to the next command.

For a write to configuration bus node 301, configuration bus control block 321 detects a corresponding module select signal cfgbus_mod_sel 337 and detects the write indicated on cfgbus_rnw 332 when cfgbus_acc 330 indicates a pending configuration bus access. The address signal cfgbus_addr 333 is applied to memory mapped registers/RAM 322. The write data cfgbus_wr_data 334 is supplied to memory mapped registers/RAM 322 for storage at the address indicated by cfgbus_addr 333. Upon completion of the write memory mapped registers/RAM 322 signals configuration bus control 321, which supplies the corresponding acknowledge signal on cfgbus_mod_ack 336. Note that data written into and now stored within memory mapped registers/RAM 322 controls the operating configuration of the port corresponding to configuration node 301 in a manner not relevant to the details of this invention.

For a write to configuration bus node 302, configuration bus control block 361 detects a corresponding module select signal cfgbus_mod_sel 337 and detects the write indicated on cfgbus_rnw 332 when cfgbus_acc 330 indicates a pending configuration bus access. The address signal cfgbus_addr 333 is applied to memory mapped registers/RAM 372 within application unit 370. Configuration bus write data cfgbus_wr_data 334 is synchronized to the application unit clock in synchronizer 365. This write data is then supplied to memory mapped registers/RAM 372 via application unit clocked configuration bus control block 371. This data is stored in the addressed location within memory mapped registers/RAM 372. Upon completion of the write operation, configuration bus control block 371 supplies a signal which is synchronized to the core clock via synchronizer 365 and further supplied to configuration bus control block 361. Configuration control block 361 then generates the corresponding signal on cfgbus_mod_ack 336. Note that data stored within memory mapped registers/RAM 372 controls the operating configuration of the port corresponding to configuration node 301 in a manner not relevant to the details of this invention. This data is coupled to the peripheral via I/O interface 374 under the control of hub interface unit control block 355.

FIG. 7 illustrates two successive configuration bus commands, a read followed by a write. In the read command configuration bus controller asserts the cfgbus_acc signal 330 high to indicate a new access on the configuration bus. It also asserts the cfgbus_rnw 332 high to indicate a read operation, and places the 16-bit word address on the cfgbus_addr signal 333. In addition, it switches the level of the corresponding cfgbus_mod_sel[X] 337 bit for that peripheral. All the above actions occur during time cycle T1.

When the peripheral completes the read during time cycle T4, it places the read data on the cfgbus_rd_data signal 335, and switches the level of its cfgbus_mod_ack[X] 336 bit. The configuration bus controller detects the cfgbus_mod_ack[X] switch and senses the data on the cfgbus_rd_data 335.

This is followed by a write command. The configuration bus controller asserts the cfgbus_acc signal 330 high to indicate a new access on the configuration bus, and asserts the cfgbus_rnw 332 low to indicate a write both during time cycle T5. It places the new 16 bit address on the cfgbus_addr signal 333, and the new write data D2 on the cfgbus_wr_data signal 334. The configuration bus controller also switches the cfgbus_mod_sel[X] signal 337 bit corresponding to the peripheral accessed. When the peripheral has completed the write in later clock cycles, it will the switch the level of the cfgbus_mod_ack[X] 336 bit low again, allowing the configuration bus controller to proceed to the next command.

Note configuration bus controller 300 processes commands in order, and waits until each peripheral has finished the current command before proceeding to the next command. This occurs even if the current command is a write command which requires no return data. This forces control registers in the peripherals to a guaranteed order and completion before successive control register accesses.

An advantage of the configuration bus protocol is that by using synchronizers, such as synchronizer 365, on the cfgbus_mod_sel and cfgbus_mod_ack signals, peripherals running at other frequencies can still be used without modification. The synchronizers convert the cfgbus_mod_sel and cfgbus_mod_ack signals to the peripheral frequency, and the peripheral otherwise uses the cfgbus_rnw, cfgbus_addr, cfgbus_rd_data, and cfgbus_wr_data as usual. When the peripheral finishes the command it switches the cfgbus_mod_ack signal as usual, and the synchronizer converts it back to the configuration bus controller frequency.

An accompanying advantage is that the configuration bus makes no assumptions about the delay of peripherals to respond to configuration bus commands. It simply waits for the corresponding cfgbus_mod_ack bit to switch, and stalls otherwise. This allows each peripheral take any amount of time to perform the command, permitting slow or fast peripherals to be used in future systems without modification. Only one change is required for peripherals operating at different frequencies. The multiplexing on the cfgbus_rd_data for upstream data must be done at the core clock frequency using the cfgbus_acc signal to guarantee upstream data is not blocked out by a slow downstream peripheral. As an example, a 20 MHZ peripheral must not switch its multiplexer before a 200 MHZ peripheral delivers its cfgbus_rd_data.

In earlier Texas Instruments TMS320C60 digital signal processor designs, a peripheral bus (P-BUS) performed tasks comparable to configuration bus of this invention. The main differences between the prior art P-BUS and the configuration bus involve the (1) bus routing, (2) synchronization benefits and (3) latency requirements.

In the prior art P-BUS, the command and write data are broadcast to all nodes forming a layout something like points of a star or spokes of a wheel. The configuration bus of this invention instead chains the command with each node forming a link in the chain. The prior art P-BUS routes the returning read data from each node individually back to the controller. The configuration bus of this invention again chains the read data through each node back to the controller instead. For the prior art P-BUS, there are up to 16 sets of data going between the controller and each node. In the in configuration bus of this invention there is one set of data from the controller to the first node, and from one node to the next and so on. All of these factors ease the routing of the integrated circuit, especially if the placement of these nodes is not known.

In the prior art P-BUS module select (mod_sel) signals were all pulse based. A mod_sel signal would go high for a cycle to indicate a transaction. In configuration bus of this invention the cfgbus_mod_sel signals and the cfgbus_mod_ack signals will just switch levels to indicate a transaction. This allows synchronizers to be used with configuration bus cfgbus_mod_sel and cfgbus_mod_ack without alteration. The prior art P-BUS mod_sel signal cannot be applied to a synchronizer since a core clock pulse may not be seen by a peripheral clock if the peripheral clock is much slower.

The above synchronization issues lead to the third difference, latency requirements. The prior art P-BUS requires a transaction to be completed in 3 core cycles regardless of its destination. A prior art P-BUS read in time cycle T0 will always have data ready in time cycle T2. Thus there is no need for mod_ack signals at all. This signal is not set in the prior art P-BUS. In configuration bus of this invention this timing requirement was relaxed so that slow peripherals could be used without requiring high-speed components. Thus a cfgbus_mod_sel switches and the configuration bus controller waits for the associated cfgbus_mod_ack to switch before assuming the transaction has completed. Not only does this allow slower peripherals to be used, but it avoids having a required guaranteed access times for certain memory-mapped registers and random access memory which might only have one access port which could be needed by other hardware. Because of this, the configuration bus of this invention will just stall until the other hardware is done with the registers or memory. Then let the configuration bus access will proceed. In the prior art P-BUS the read/write must take place in those three cycles or it is lost.

The prior art P-BUS on earlier digital signal processor designs was not scalable in terms of timing. It was assumed that all accesses completed in three clock cycles which may not hold for higher frequency versions of the digital signal processor integrated circuit. The configuration bus of this invention is designed with asynchronous access in mind. This allows complete peripheral blocks to operate in a single clock domain. Configuration bus synchronizers are, in the preferred embodiment, consolidated in the hub interface unit (HIU).

Briefly the synchronization approach proceeds as follows. The hub interface unit will take in the central processing unit clocked configuration bus, synchronize the cfgbus_mod_sel and cfgbus_mod_ack signals between the core clock and the peripheral clock, and pass all the other signals/buses between the configuration bus and the peripheral directly. In this way, the configuration bus data is fully setup by the time the control signals are synchronized through to the peripheral. In the reverse direction, the read data is fully setup within the time cfgbus_mod_ack signals are synchronized with respect to the central processing unit clock domain. The synchronization mechanisms are identical to those currently in each hub interface unit for expanded direct memory access processor to peripheral communication. This also has the advantage of isolating where the multi-domain clocking must be handled, in the hub interface units only, not in both the hub interface units and the peripherals.

In contrast to dedicating a bus between each configuration bus node and the controller of the prior art P-BUS, the configuration bus of this invention uses a chain flow to reduce routing requirements and multiplexing at the controller. The chain is produced by connecting the inputs and outputs of each node to its neighbors, delivering only one set of signals to that neighbor. The signals driven by the controller that indicate the command, address, and write data are simply passed from one node to the next, since this information only changes from the controller directly.

For the returned acknowledgment and the read data, each node simply multiplexes between its local acknowledge signal and read data signal when the command was directed to that particular configuration bus node, and the downstream neighbor node when being sent upward to the configuration bus controller. To support transport delays and the fact that the signals may not be able to pass through all the configuration bus nodes in a single cycle, a register may be placed inside each node to temporarily store these signals before passing the data to the neighbor.

Figure 8:
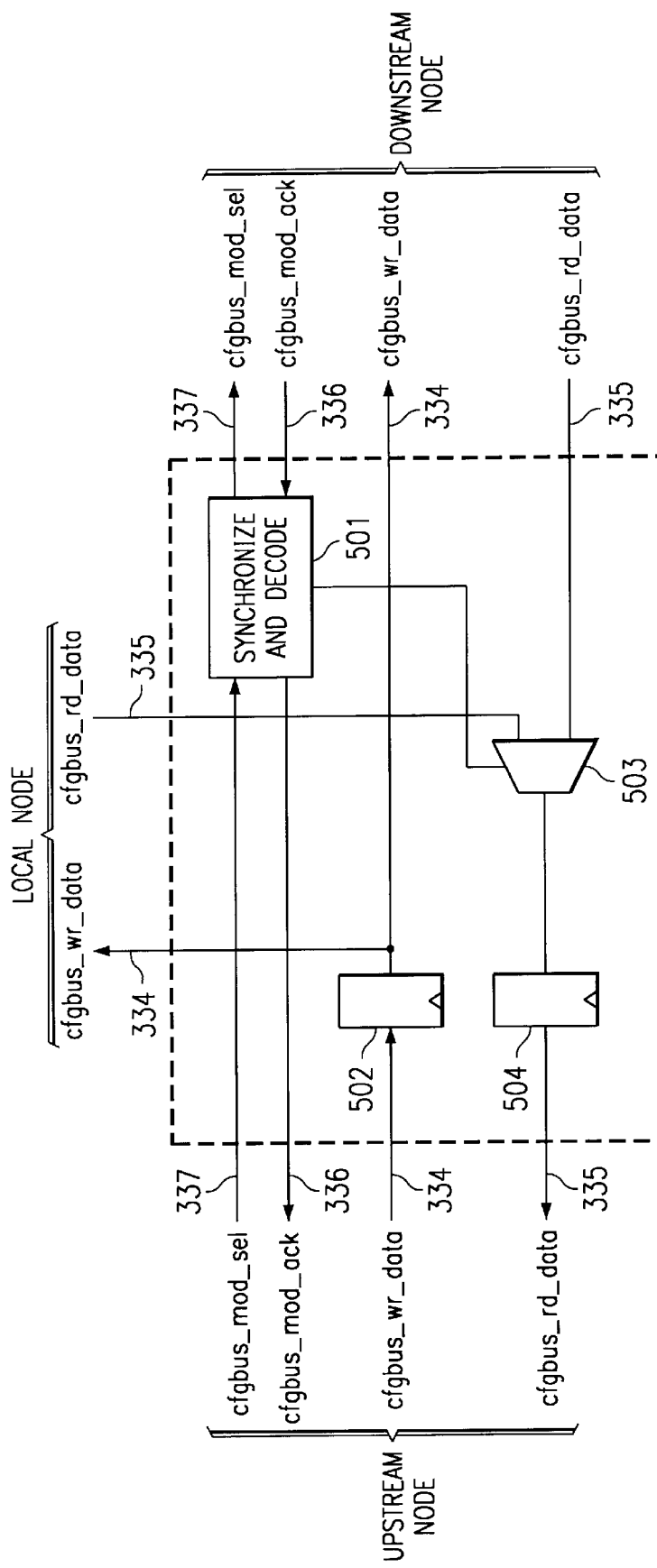
FIG. 8 illustrates a latch structure optionally used in configuration bus nodes.

FIG. 8 illustrates an example of the type register latch that may be used if needed in the configuration bus nodes. FIG. 8 illustrates only those portions of the configuration bus node relevant to data latching. The signal cfgbus_mod_sel 337 is supplied to synchronization and decode block 501 from the next upstream node. Synchronization and decode block 501 detects whether the signal cfgbus_mod_sel 337 indicates a configuration bus operation directed to that node. Synchronization and decode block 501 also synchronizes this signal to the peripheral clock. Note that configuration nodes that operate at the core clock, such as configuration bus node 301 illustrated in FIG. 3, need no such synchronization. Synchronization and decode block 501 supplies the corresponding bit signal of cfgbus_mod_ack 336 to the next upstream node. This signal is synchronized from a signal produced according to the peripheral clock if necessary. Synchronization and decode block 501 passes bits of cfgbus_mod_ack 336 from downstream nodes unchanged. The write data cfgbus_wr_data 334 is latched in register 502. The output of register 502 supplies both the current node and the next downstream node. Thus the write data cfgbus_wr_data 334 is supplied to all configuration nodes. Read data cfgbus_rd_data 335 from the next downstream node is applied to one input of multiplexer 503. A second input of multiplexer 503 receives read data from the current node. Synchronization and decode block 501 controls the selection of multiplexer 503. If the last received cfgbus_mod_sel 337 indicates selection of the current node, then synchronization and decode block 501 controls multiplexer 503 to select the read signal from the current node. Otherwise synchronization and decode block 501 controls multiplexer 503 to select the read signal from the downstream node. The read signal selected by multiplexer 503 is latched into register 504. The output of register 504 supplies the read data to the next upstream node. Thus the read data cfgbus_rd_data 335 from the selected node is supplied to configuration bus controller 300 at the upstream end of the chain of configuration nodes.

The latch structure illustrated in FIG. 8 need not be used in every configuration node. The circuit designer should determine whether to use the register in the path of a node by examining simulated timing results. This preferably takes into account the design layout and the individual distances signals must traverse between nodes. The latch structure of FIG. 8 need only be used is the signals cannot successfully cross the node within a single core clock cycle. Thus lower latency may be achieved on the configuration bus when compared to the case of inserting registers at each node.

Figure 9:
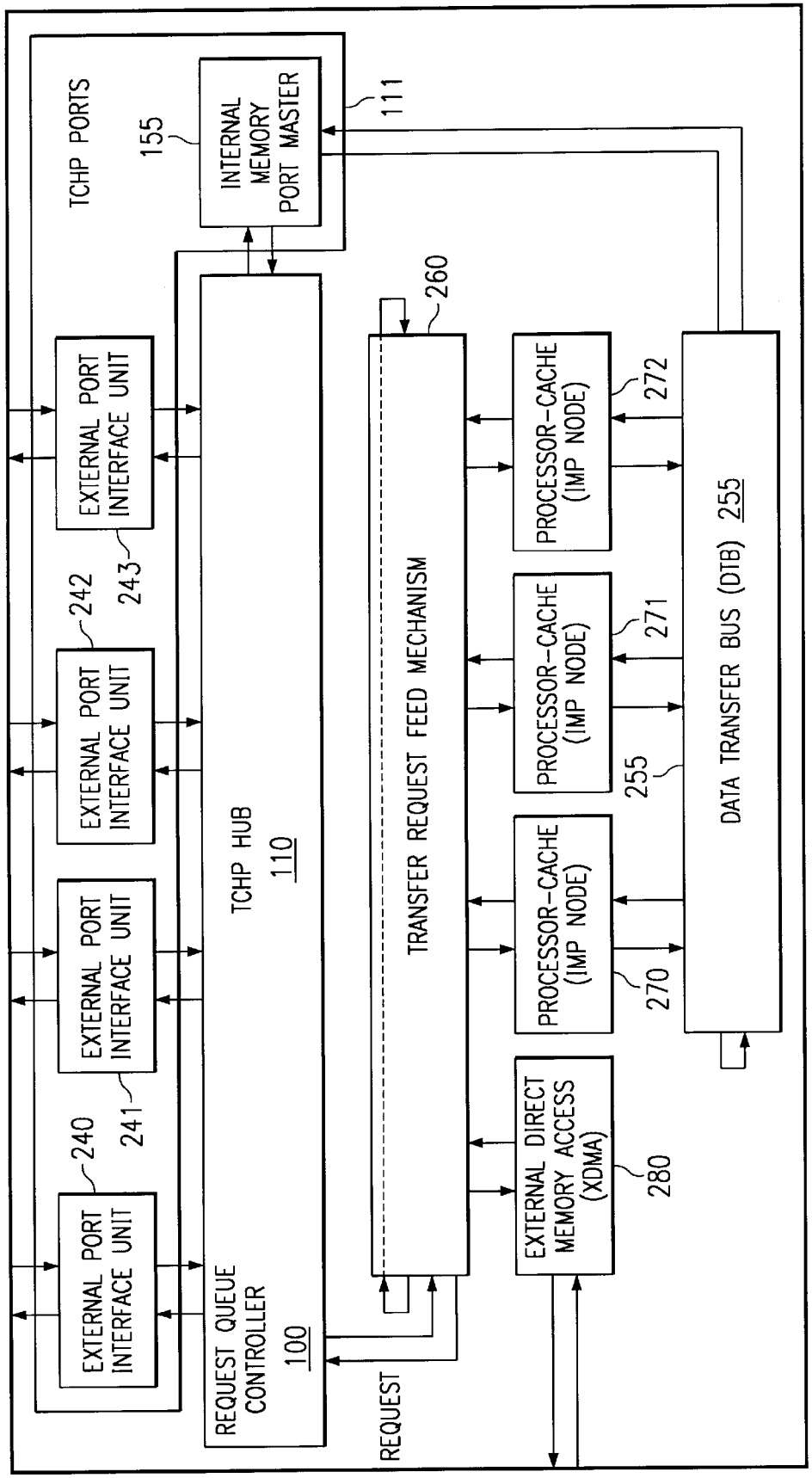
FIG. 9 illustrates the functional blocks of the transfer controller hub and its interface to external ports and internal memory port master of a multiprocessor integrated circuit to which this invention is applicable.

FIG. 9 illustrates from a higher level an overview of an multiprocessor integrated circuit employing the transfer controller with hub and ports of this invention. There are four main functional blocks. The transfer controller with hub and ports 110 and the ports including ports external port interface units 240 to 243 and internal memory port 250 are the first two main functional blocks. The other two main functional blocks are the transfer request feed mechanism 260 and the data transfer bus (DTB) 255. These are closely associated functional units that are but not a part of the transfer controller with hub and ports 110. Transfer request feed mechanism 260 is coupled to plural internal memory port nodes 270, 271 and 272. Each of these internal memory port nodes includes an independently programmable data processor, which may be a digital signal processor, and corresponding cache memory or other local memory. The internal construction of these internal memory port nodes is not important for this invention. For the purpose of this invention it sufficient that each of the internal memory port nodes can submit transfer requests via transfer request feed mechanism 260 and has memory that can be a source or destination for data. Transfer request feed mechanism 260 prioritizes these packet transfer requests in a manner not relevant to this invention. Transfers originating from or destined for internal memory port nodes 270, 271 or 272 are coupled to transfer controller with hub and ports 110 via data transfer bus 255 and internal amemory port master 250. As previously described, internal memory port master 250 may not require the write driven process of this invention if internal memory port nodes 270, 271 and 272 have memory transfer bandwidth equivalent to the memory transfer bandwidth of transfer controller with hub and ports 110. FIG. 9 highlights the possible connection of data transfer bus 255 to multiple internal memory port nodes 270, 271 and 272 and the possible connection of multiple transfer request nodes to transfer request feed mechanism 260. This represents an example of the mode of use of the write driven process of this invention and not its only context of use.

Figure 10:
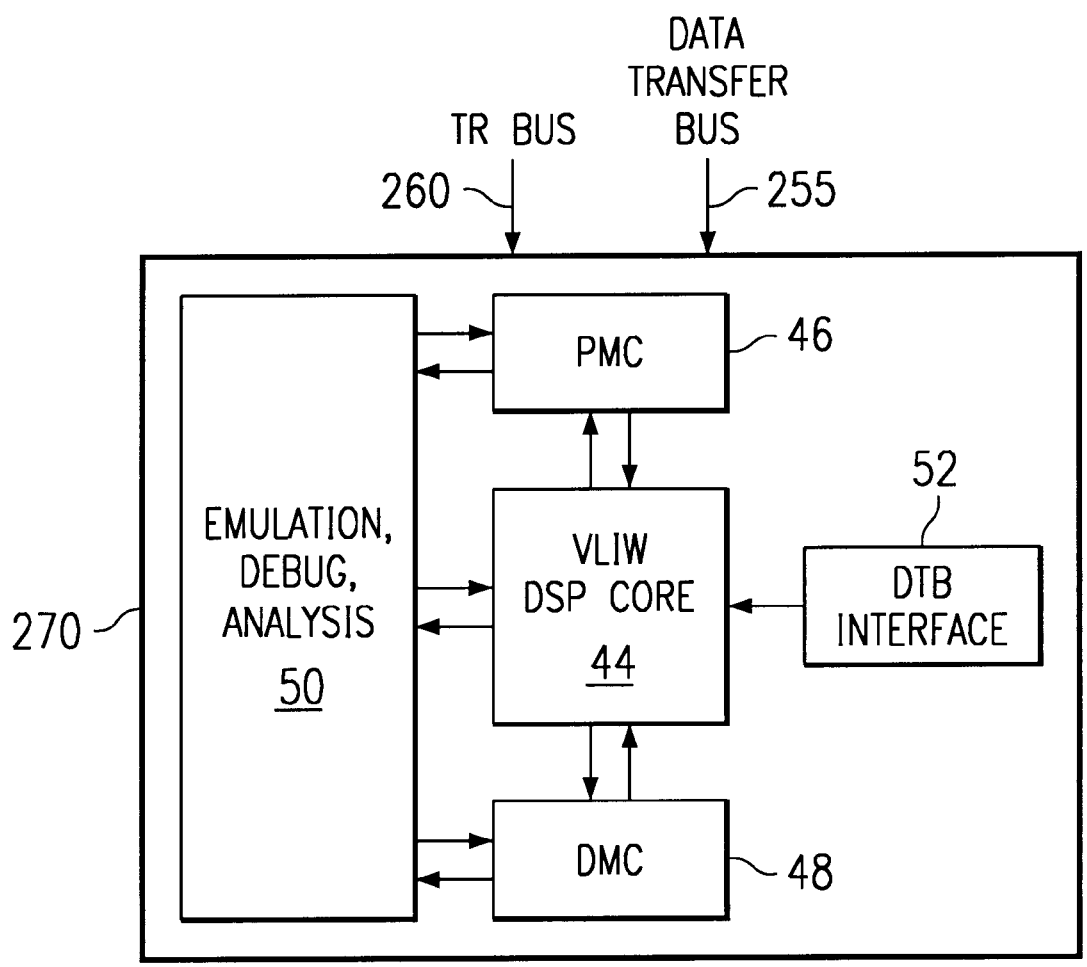
FIG. 10 illustrates a block diagram form an example of one of the multiple processors illustrated in FIG. 9.

FIG. 10 illustrates a block diagram of an example of a preferred processor and cache memory combination implementing the internal memory nodes 270, 271 and 272 of FIG. 9. This is designated as digital processing unit core 270 in FIG. 9. Each internal memory node 270, 271 and 272 preferably includes a digital signal processor core and corresponding instruction and data cache memory. Transfer controller with hub and ports 110 provides for all data communication among internal memory nodes 270, 271 and 272, external input/output (I/O) devices and peripherals at external ports 240 to 243. Each internal memory node 270, 271 and 272 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Internal memory nodes 270, 271 and 272 and transfer controller with hub and ports 110 communicate over a pair of high throughput buses. Transfer request feed mechanism 260 is used by digital signal processor cores 44 to specify and request transactions in transfer controller with hub and ports 110. Data transfer bus (DTB) 255 is used to load and store data from objects in the global memory map. While any given digital signal processor core 44 can access its own internal local memory within the cluster without permission from transfer controller with hub and ports 110, any access to global memory outside of its local memory requires a transfer controller directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 11:
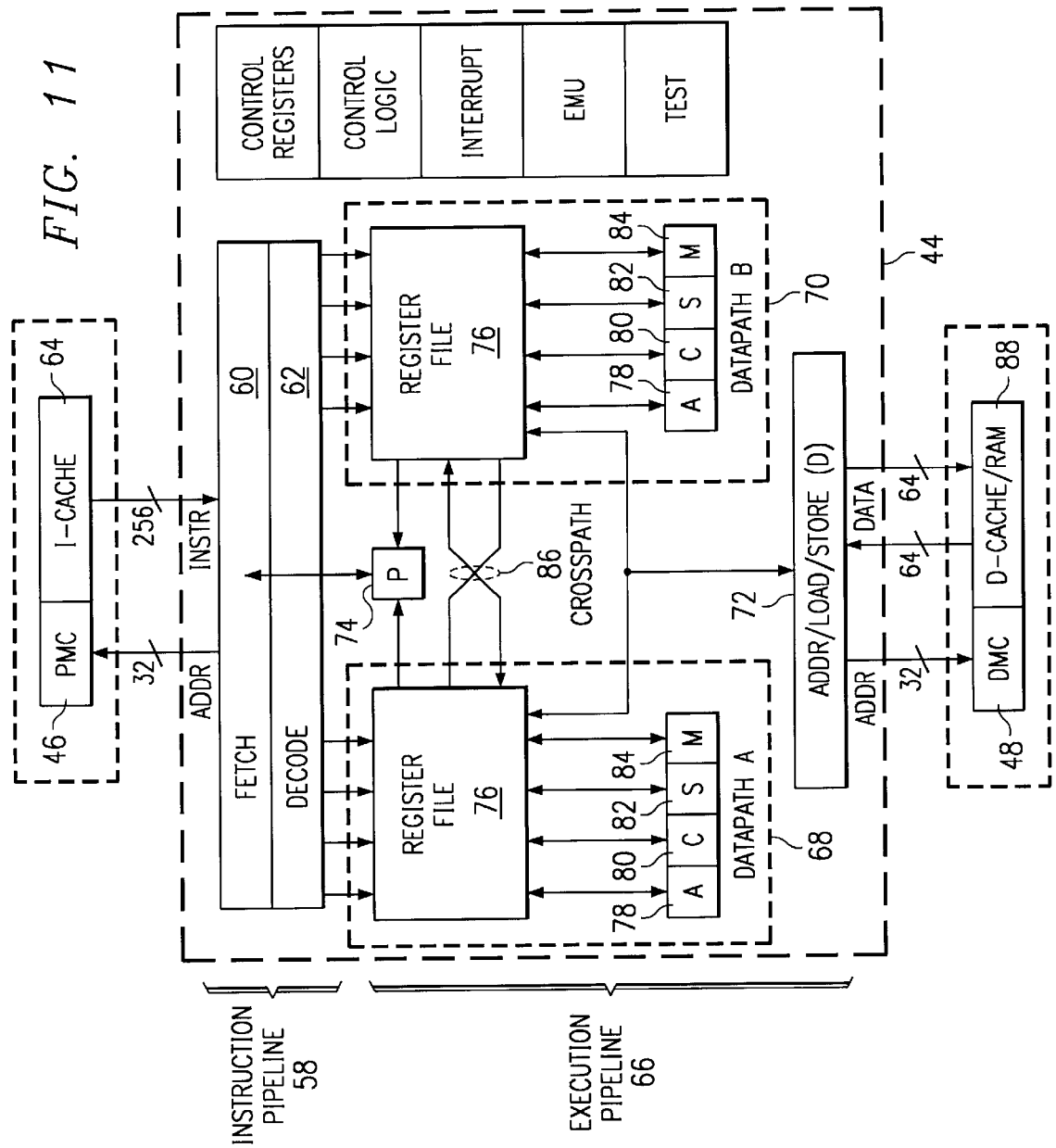
FIG. 11 illustrates further details of the very long instruction word digital signal processor core illustrated in FIG. 10.

FIG. 11 is a block diagram illustrating more detail of digital signal processor core 44 illustrated in FIG. 10. Digital signal processor core 44 is a 32-bit eight-way VLIW pipelined processor. The instruction set consists of fixed length 32-bit reduced instruction set computer (RISC) type instructions that are tuned for digital signal processing applications. Almost all instructions perform register-to-register operations and all memory accesses are performed using explicit load/store instructions. As shown in FIG. 11, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to eight instructions. Each instruction in the execute packet is then translated into control signals to drive the appropriate units in execution pipeline 66. Execution pipeline 66 consists of two symmetrical data paths, data path A 68 and data path B 70, a common 64-bit load/store unit group D-unit group 72, and a common branch unit group P-unit group 74. Each data path contains 32-word register file (RF) 76, and four execution unit groups, A-unit group 78, C-unit group 80, S-unit group 82, and M-unit group 84. Overall there are ten separate unit groups in execution pipeline 66. Eight of these units may scheduled concurrently every cycle. Each functional unit group contains plural functional units, some of which are duplicated between unit groups. In total there are nine 32-bit adders, four 32-bit shifters, three Boolean operators, and two 32 bit by 16 bit multipliers. The multipliers are each configurable into two 16 bit by 16 bit multipliers or into four 8 bit by 8 bit multipliers. The memory at internal memory nodes 270, 271 and 272 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request data transfers in is several ways. Digital signal processor core 44 may issue a data transfer request to transfer controller with hub and ports 110 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by transfer controller with hub and ports 110. Thus any digital signal processor core 44 may transfer data internally or externally and load or read any internal memory node.

Each digital processor core 44 preferably also includes automatic mechanisms for generating requests for data transfer for cache service. Thus an instruction cache miss preferably causes program memory controller 46 to generate a data transfer request from another data source to fill a line of instruction cache 64 with data including program instructions stored at the address generating the cache miss. Similarly, a data cache miss on a data read preferably causes data memory controller 48 to generate a data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit. There are two alternatives for data cache misses on data writes. In a write through mode, a data write by digital processor core 44 that misses data cache/random access memory 88 causes data memory controller 48 to generate a data transfer request to store the write data in the appropriate location in a higher level of memory. In a writeback mode, a data write by digital processor core 44 that misses data cache/random access memory 88 causes data memory controller 48 to generate a data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a data transfer request to handle data writeback to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Transfer controller with hub and ports 110 is preferably employed for this writeback of evicted dirty cache entries.

Figure 12:
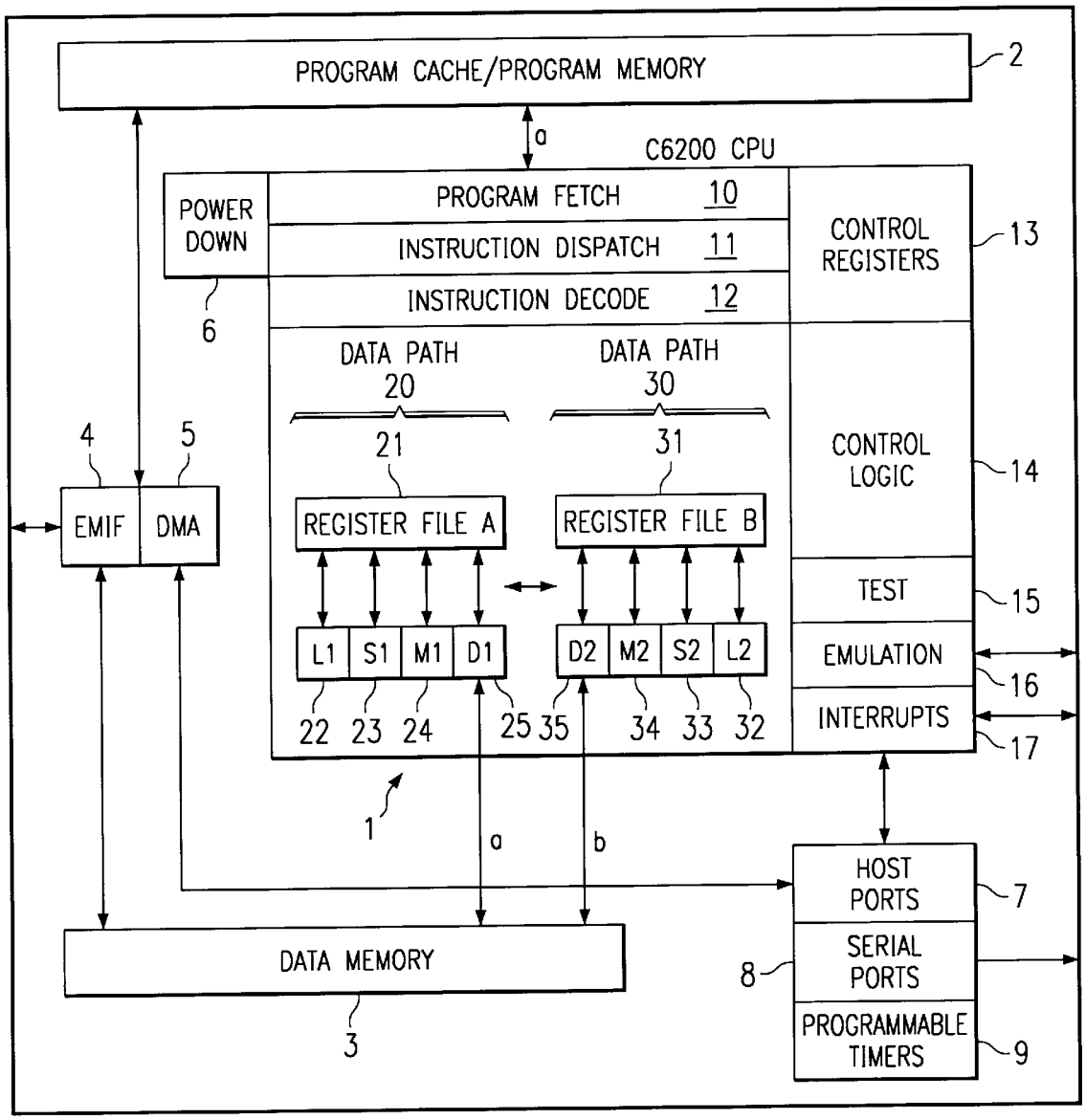
FIG. 12 illustrates further details of another very long instruction word digital signal processor core suitable for use in FIG. 9.

FIG. 12 is a block diagram illustrating details of an alternative digital signal processor cores 270, 271 and 272 of FIG. 9. Digital signal processor core of FIG. 12 is a 32-bit eight-way VLIW pipelined processor. The digital signal processor includes central processing unit 1, shown in the right center portion of FIG. 12. Digital signal processor 270 includes program memory 2 which may optionally be used as a program cache. Digital signal processor core 270 may also. have varying sizes and types of data memory 3. Digital signal processor 270 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals includes power-down logic 6. Power-down logic 6 preferably can halt central processing unit activity, peripheral activity, and phase lock loop (PLL) clock synchronization activity to reduce power consumption. These peripherals also includes host ports 7, serial ports 8 and programmable timers 9.

Digital signal processor core 270 has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Program memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 20 and D1 unit 25 and 16 32-bit registers forming register file 21. Second data path 30 likewise includes four functional units designated L2 unit 32, S2 unit 33, M2 unit 34 and D2 unit 35 and 16 32-bit registers forming register file 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 13A:
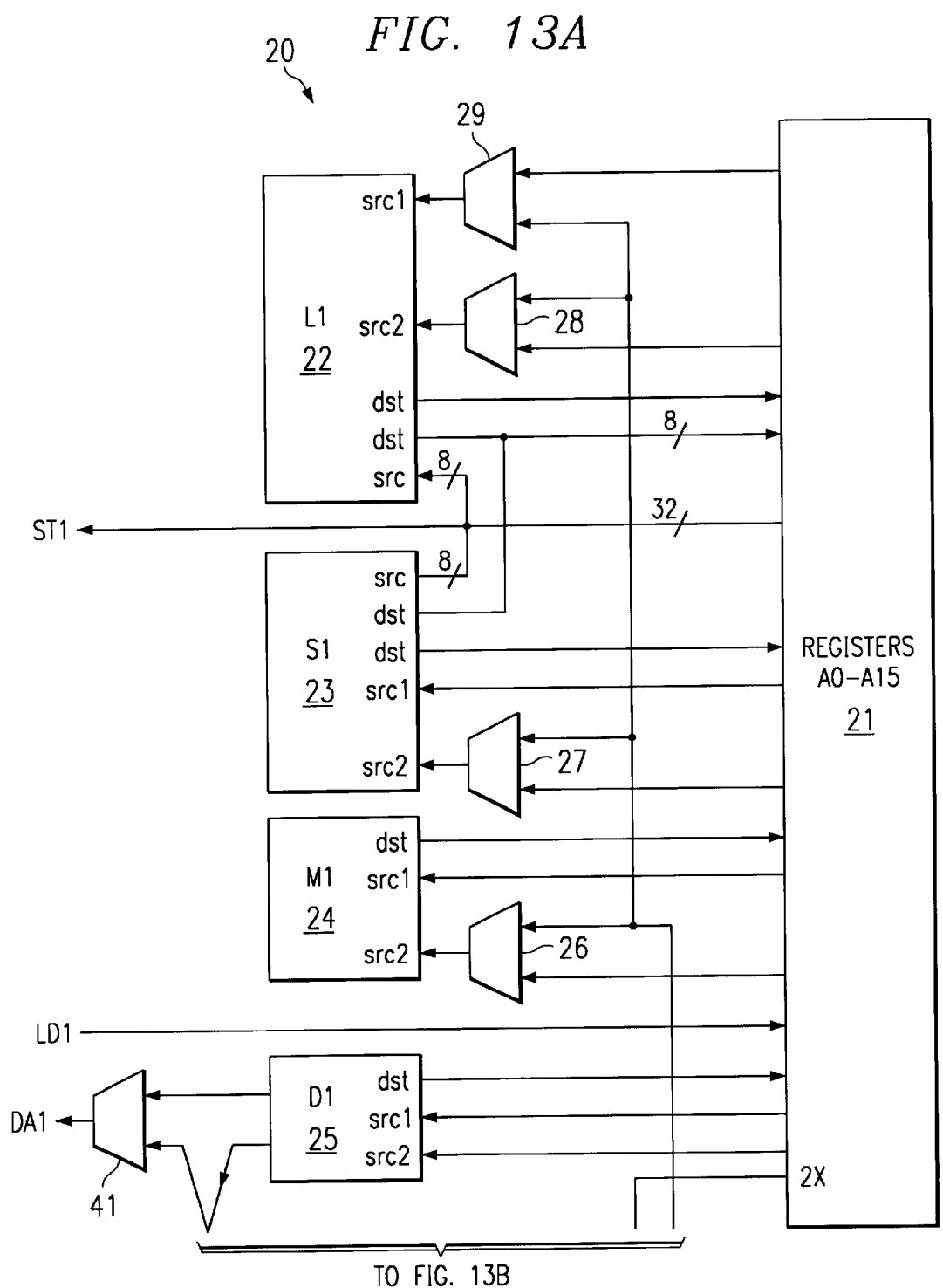
FIGS. 13A and 13B together illustrate additional details of the digital signal processor of FIG. 12.
Figure 13B:
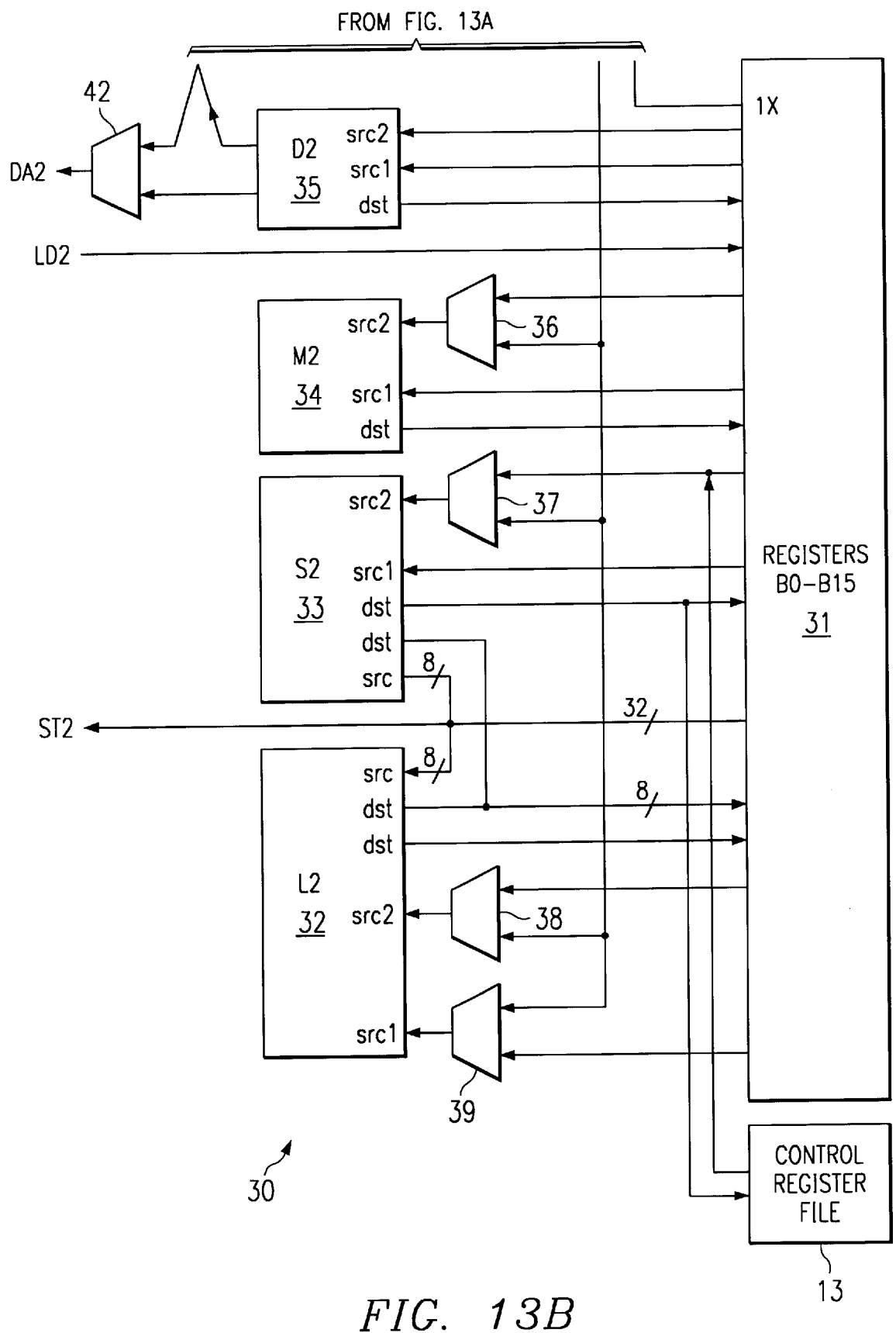

FIGS. 13A and 13B together illustrate the data paths of central processing unit 1. There are two general purpose register files 21 and 31. Each of general purpose register files 21 and 31 include 16 32-bit registers. These registers are designated registers A0 to A15 for register file 21 and registers B0 to B15 for register file 31. These general purpose registers can be used for data, data address pointers or as condition registers.

There are eight functional units L1 unit 22, L2 unit 32, S1 unit 23, S2 unit 33, M1 unit 24, M2 unit 34, D1 unit 25 and D2 unit 35. These eight functional units can be divided into two virtually identical groups of 4 (22 to 25 and 32 to 35) coupled to a corresponding register file. There are four types of functional units designated L, S, M and D. Table 1 lists the functional capabilities of these four types of functional units.

TABLE 1

Functional Units and Descriptions

| Functional Unit | Description |
|---|---|
| L Unit (L1, L2) | 32/40-bit arithmetic and compare operations<br>Left most 1, 0, bit counting for 32 bits<br>Normalization count for 32 and 40 bits<br>32 bit logical operations |
| S Unit (S1, S2) | 32-bit arithmetic operations<br>32/40 bit shifts and 32-bit bit-field operations<br>32 bit logical operations,<br>Branching<br>Constant generation<br>Register transfers to/from the control register file |
| M Unit (M1, M2) | 16 × 16 bit multiplies |
| D Unit (D1, D2) | 32-bit add, subtract, linear and circular address calculation |

Most data lines within central processing unit 1 support 32-bit operands. Some data lines support long (40-bit) operands. Each functional unit has its own 32-bit write port into the corresponding general-purpose register file. Functional units L1 unit 22, S1 unit 23, M1 unit 24 and D1 unit 25 write to register file 21. Functional units L2 unit 32, S2 unit 33, M2 unit 34 and D2 unit 35 write to register file 31. As depicted in FIG. 13, each functional unit has two 32-bit read ports for respective source operands src1 and src2 from the corresponding register file. The four functional units L1 unit 22, L2 unit 32, S1 unit 23 and S2 unit 33 have an extra 8-bit wide write port for 40-bit long writes as well as an extra 8-bit wide read port for 40-bit long reads. Because each functional unit has its own 32-bit write port, all eight functional units can be used in parallel every cycle.

FIG. 13 illustrates cross register paths 1X and 2X. Function units L1 unit 22, S1 unit 23 and M1 unit 24 may receive one operand from register file 31 via cross register path 1X. Function units L2 unit 32, S2 unit 33 and M2 unit 34 may receive one operand from register file 21 via cross register path 2X. These paths allow the S, M and L units from each data path to access operands from either register file 21 or 31. Four functional units, M1 unit 24, M2 unit 34, S1 unit 23 and S2 unit 33, have one 32-bit input multiplexer which may select either the same side register file or the opposite file via the respective cross path 1X or 2X. Multiplexer 26 supplies an operand from either register file 21 or register file 31 to the second source input src2 of M unit 24. Multiplexer 36 supplies an operand from either register file 21 or register file 31 to the second source input src2 of M unit 34. Multiplexer 27 supplies an operand from either register file 21 or register file 31 to the second source input src2 of S unit 23. Multiplexer 37 supplies an operand from either register file 21 or register file 31 to the second source input src2 of S unit 33. Both the 32-bit inputs of function units L1 unit 22 and L2 unit 32 include multiplexers which may select either the corresponding register file or the corresponding cross path. Multiplexer 28 supplies the first source input src1 of L unit 22 and multiplexer 29 supplies the second source input src2. Multiplexer 38 supplies the first source input src1 of L unit 32 and multiplexer 39 supplies the second source input src2.

There are two 32-bit paths for loading data from memory to the register file. Data path LD1 enables loading register file A and data path LD2 enables loading register file B. There are also two 32-bit paths for storing register values to memory from the register file. Data path ST1 enables storing data from register file A to memory and data path ST2 enables storing data from register file B to memory. These store paths ST1 and ST2 are shared with the L unit and S unit long read paths.

FIG. 13 illustrates two data address paths (DA1 and DA2) coming from respective D units 25 and 35. These data address paths allow supply of data addresses generated by the D units to specify memory address. D unit 25 and D unit 35 each supply one input to address multiplexers 41 and 42. Address multiplexers 41 and 42 permit D unit 25 to support loads from memory to either register file 21 or register file 31 and to support stores from either register file 21 or register file 31 to memory. Address multiplexers 41 and 42 likewise permit D unit 35 to support loads and stores involving either register file 21 or register file 31.

FIGS. 13A and 13B together illustrate data paths enabling S2 unit 33 to read from and to write to the control register file 13.

What is claimed is:

1. A data processing apparatus comprising:
    a configuration bus having a write data bus, an address bus, and a module select bus having a line for each of said plurality of configurable peripheral device interfaces;
    a plurality of configurable peripheral device interfaces, each configurable peripheral device having at least one memory mapped register storing data controlling a configuration of said configurable peripheral device and operable to connect to a corresponding peripheral device, said configurable peripheral device interfaces connected to said configuration bus in a chain, each of said plurality of configurable peripheral device interfaces being responsive to a signal in a first digital state on a corresponding line of said module select bus to read data on said data bus of said configuration bus and store said read data in a memory mapped register corresponding to an address on said address bus of said configuration bus as to a signal in a second digital state opposite to said first digital state on said corresponding line of said module select bus to ignore signals on said data bus and address bus of said configuration bus; and
    a configuration controller connected to said configuration bus, said configuration controller operable to write configuration data to said at least memory mapped register of each of said plurality of configurable peripheral device interfaces via write data bus of said configuration bus.

2. The data processing apparatus of claim 1, wherein:
    said configuration bus further includes a module acknowledge bus having a line for each of said plurality of configurable peripheral device interfaces;
    each of said plurality of configurable peripheral device interfaces generates an acknowledge signal on a corresponding line of said module acknowledge bus upon completion of storing said read data in a memory mapped register corresponding to an address on said address bus of said configuration bus.

3. The data processing apparatus of claim 1, wherein:
    said configuration bus further includes an access line;
    each of said plurality of configurable peripheral device interfaces is responsive to a first digital signal on said access line to ignore signals on said data bus, said address bus and said module select bus of said configuration bus and responsive to a second digital signal opposite to said first digital signal on said access line to respond to signals on said data bus, said address bus and said module select bus of said configuration bus.

4. The data processing apparatus of claim 1, wherein:
    at least one of said plurality of configurable peripheral device interfaces further includes a write data latch having an input receiving write date from a next upstream configurable peripheral device interface in said chain via said write data bus of said configuration bus and an output supplying write data to a configurable peripheral device interface next downstream in said chain, said write data latch temporarily storing write data therein.

5. The data processing apparatus of claim 1, wherein:
    at least one of said plurality of configurable peripheral device interfaces further includes
        a write data latch having an input receiving write date from a next upstream configurable peripheral device interface in said chain via said write data bus of said configuration bus and an output supplying write data to a configurable peripheral device interface next downstream in said chain, said write data latch temporarily storing write data therein,
        a multiplexer having a first input receiving read data from said memory mapped register of said configurable peripheral device interface, a second input receiving read data from a configurable peripheral device interface next downstream in said chain, an output and a control input,
        a read data latch having an input connected to said output of said multiplexer and an output supplying read data to a configurable peripheral device interface next upstream in said chain, said read data latch temporarily storing read data therein, and a decoder connected to said module select lines and said control input of said multiplexer, said decoder controlling said multiplexer to select said read data from said memory mapped register of said configurable peripheral device interface if said corresponding line of said module select bus has said first digital state and to select said read data from said configurable peripheral device interface next downstream in said chain if said corresponding line of said module select bus has said second digital state.

6. A data processing apparatus comprising:

a configuration bus having a write data bus and an address bus;

a plurality of configurable peripheral device interfaces, each configurable peripheral device having at least one memory mapped register storing data controlling a configuration of said configurable peripheral device and operable to connect to a corresponding peripheral device, said configurable peripheral device interfaces connected to said configuration bus in a chain;

a configuration controller connected to said configuration bus, said configuration controller operable to write configuration data to said at least memory mapped register of each of said plurality of configurable peripheral device interfaces via write data bus of said configuration bus;

said configuration controller and said configuration bus are clocked at first frequency;

at least one of said plurality of configurable peripheral device interfaces includes
  a first clock domain clocked at said first frequency,
  a second clock domain clocked at a second frequency of said corresponding peripheral device, and
  a synchronizer connected to said first clock domain and said second clock domain operative to synchronize signals passing between said first clock domain and said second clock domain.

7. A data processing apparatus comprising:

a configuration bus having a write data bus, an address bus and a read data bus;

a plurality of configurable peripheral device interfaces, each configurable peripheral device having at least one memory mapped register storing data controlling a configuration of said configurable peripheral device and operable to connect to a corresponding peripheral device, said configurable peripheral device interfaces connected to said configuration bus in a chain, at least one of said plurality of configurable peripheral device interfaces being a readable configuration peripheral device interface which further includes at least one memory mapped register storing data identifying the corresponding peripheral device; and a configuration controller connected to said configuration bus, said configuration controller operable to write configuration data to said at least memory mapped register of each of said plurality of configurable peripheral device interfaces via write data bus of said configuration bus, said configuration controller being further operable to read configuration data from saidat least memory mapped register of said at least one readable configurable peripheral device interface via said read data bus of said configuration bus.

8. A data processing apparatus comprising:

a configuration bus having a write data bus and an address bus;

a plurality of configurable peripheral device interfaces, each configurable peripheral device having at least one memory mapped register storing data controlling a configuration of said configurable peripheral device and operable to connect to a corresponding peripheral device, said configurable peripheral device interfaces connected to said configuration bus in a chain;

a configuration controller connected to said configuration bus, said configuration controller operable to write configuration data to said at least memory mapped register of each of said plurality of configurable peripheral device interfaces via write data bus of said configuration bus;

a data transfer hub connected to dispatch data transfer requests specifying a data source, a data destination and a data quantity to be transferred; and wherein each of said plurality of configurable peripheral device interfaces being connected to said data transfer hub and further including
  an hub interface unit connected to said data transfer hub, said hub interface unit for each being identically configured, and
  an application unit interface connected to said corresponding hub interface unit and configured for an external memory/device expected to be connected to said configurable peripheral device interface, said hub interface unit and said application unit interface operatively connected for data transfer therebetween by a predetermined set of interface signal lines identical for all configurable peripheral device interfaces; and said data transfer hub controlling data transfer from a source configurable peripheral device interface corresponding to said data source to a destination configurable peripheral device interface corresponding to said data destination in a quantity corresponding to said data quantity to be transferred of a currently executing data transfer request.

9. A data processing system comprising:

a plurality of data processors, each data processor capable of generating a data transfer request specifying a data source, a data destination and a data quantity to be transferred;

a data transfer hub connected to said plurality of data processors to dispatch data transfer requests;

a configuration bus having a write data bus and an address bus;

a plurality of configurable peripheral device interfaces each connected to said data transfer hub and including
  an hub interface unit connected to said data transfer hub, said hub interface unit for each port being identically configured, and
  an application unit interface connected to said corresponding hub interface unit and configured for an external memory/device expected to be connected to said port, said hub interface unit and said application unit interface operatively connected for data transfer therebetween by a predetermined set of interface signal lines identical for all ports,
  at least one memory mapped register storing data controlling a configuration of said configurable peripheral device and operable to connect to a corresponding peripheral device, said configurable peripheral device interfaces connected to said configuration bus in a chain;

a configuration controller connected to said configuration bus, said configuration controller operable to write configuration data to said at least memory mapped register of each of said plurality of configurable peripheral device interfaces via write data bus of said configuration bus; and said data transfer hub controlling data transfer from a source port corresponding to said data source to a destination port corresponding to said data destination in a quantity corresponding to said data quantity to be transferred of a currently executing data transfer request.

10. The data processing system of claim 9, wherein:

said configuration bus further includes a module select bus having a line for each of said plurality of configurable peripheral device interfaces;

each of said plurality of configurable peripheral device interfaces is responsive to a signal in a first digital state on a corresponding line of said module select bus to read data on said data bus of said configuration bus and store said read data in a memory mapped register corresponding to an address on said address bus of said configuration bus as to a signal in a second digital state opposite to said first digital state on said corresponding line of said module select bus to ignore signals on said data bus and address bus of said configuration bus.

11. The data processing system of claim 10, wherein:

said configuration bus further includes a module acknowledge bus having a line for each of said plurality of configurable peripheral device interfaces;

each of said plurality of configurable peripheral device interfaces generates an acknowledge signal on a corresponding line of said module acknowledge bus upon completion of storing said read data in a memory mapped register corresponding to an address on said address bus of said configuration bus.

12. The data processing system of claim 10, wherein:

said configuration bus further includes an access line;

each of said plurality of configurable peripheral device interfaces is responsive to a first digital signal on said access line to ignore signals on said data bus, said address bus and said module select bus of said configuration bus and responsive to a second digital signal opposite to said first digital signal on said access line to respond to signals on said data bus, said address bus and said module select bus of said configuration bus.

13. The data processing system of claim 9, wherein:

said plurality of data processors, said data transfer hub, said configuration controller and said configuration bus are clocked at first frequency;

said application unit interface ofeach of said plurality of configurable peripheral device interfaces is clocked at second frequency corresponding to the external memory/device expected to be connected to said port; and said hub interface unit of each of said plurality configurable peripheral device interfaces includes
a first clock domain clocked at said first frequency,
a second clock domain clocked at said second frequency of said corresponding application unit interface, and
a synchronizer connected to said first clock domain and said second clock domain operative to synchronize signals passing between said first clock domain and said second clock domain; and at least one of said plurality of configurable peripheral device interfaces includes
a third clock domain clocked at said first frequency,
a fourth clock domain clocked at a second frequency of said corresponding peripheral device, and
a synchronizer connected to said third clock domain and said fourth clock domain operative to synchronize signals passing between said first clock domain and said second clock domain.

14. The data processing system of claim 10, wherein:

at least one of said plurality of configurable peripheral device interfaces further includes a write data latch having an input receiving write date from a next upstream configurable peripheral device interface in said chain via said write data bus of said configuration bus and an output supplying write data to a configurable peripheral device interface next downstream in said chain, said write data latch temporarily storing write data therein.

15. The data processing system of claim 9, wherein:

said configuration bus further includes a read data bus;

at least one of said plurality of configurable peripheral device interfaces is a readable configuration peripheral device interface which further includes at least one memory mapped register storing data identifying the corresponding peripheral device;

said configuration controller is further operable to read configuration data from said at least memory mapped register of said at least one readable configurable peripheral device interface via said read data bus of said configuration bus.

16. The data, processing system of claim 10, wherein:

at least one of said plurality of configurable peripheral device interfaces further includes
a write data latch having an input receiving write date from a next upstream configurable peripheral device interface in said chain via said write data bus of said configuration bus and an output supplying write data to a configurable peripheral device interface next downstream in said chain, said write data latch temporarily storing write data therein,
a multiplexer having a first input receiving read data from said memory mapped register of said configurable peripheral device interface, a second input receiving read data from a configurable peripheral device interface next downstream in said chain, an output and a control input,
a read data latch having an input connected to said output of said multiplexer and an output supplying read data to a configurable peripheral device interface next upstream in said chain, said read data latch temporarily storing read data therein, and
a decoder connected to said module select lines and said control input of said multiplexer, said decoder controlling said multiplexer to select said read data from said memory mapped register of said configurable peripheral device interface if said corresponding line of said module select bus has said first digital state and to select said read data from said configurable peripheral device interface next downstream in said chain if said corresponding line of said module select bus has said second digital state.

17. The data processing system of claim 9, wherein:

said plurality of data processors, said data transfer hub, said configuration bus, said configuration controller and each of said plurality of configurable peripheral device interfaces are disposed on a single integrated circuit.

* * * * *